(12) United States Patent
Yin

(10) Patent No.: US 9,866,678 B2
(45) Date of Patent: Jan. 9, 2018

(54) METHOD AND DEVICE FOR UNLOCKING MOBILE TERMINAL

(71) Applicant: ZTE Corporation, Shenzhen (CN)

(72) Inventor: Fei Yin, Shenzhen (CN)

(73) Assignee: XI'AN ZHONGXING NEW SOFTWARE CO. LTD., Xi'an (CN)

( * ) Notice: Subject to any disclaimer, the term of this patent is extended or adjusted under 35 U.S.C. 154(b) by 0 days.

(21) Appl. No.: 14/912,973

(22) PCT Filed: Oct. 22, 2013

(86) PCT No.: PCT/CN2013/085712
§ 371 (c)(1),
(2) Date: Mar. 21, 2016

(87) PCT Pub. No.: WO2014/169602
PCT Pub. Date: Oct. 23, 2014

(65) Prior Publication Data
US 2016/0212258 A1    Jul. 21, 2016

(30) Foreign Application Priority Data

Aug. 19, 2013  (CN) .......................... 2013 1 0361591

(51) Int. Cl.
*H04M 1/66*     (2006.01)
*H04M 1/68*     (2006.01)
(Continued)

(52) U.S. Cl.
CPC .... *H04M 1/72577* (2013.01); *G06F 3/04883* (2013.01); *G06F 21/34* (2013.01);
(Continued)

(58) Field of Classification Search
CPC   H04W 12/12; H04W 12/06; H04L 29/08108; H04M 1/72519; G06F 3/016
(Continued)

(56) References Cited

U.S. PATENT DOCUMENTS 6,574,484 B1 *   6/2003 Carley ................. G08B 25/016
                                                    455/404.1
2007/0270187 A1 * 11/2007 Haneda ........... H04M 1/274516
                                                    455/566
(Continued)

FOREIGN PATENT DOCUMENTS

CN    102236526 A    11/2011
CN    102693430 A     9/2012
CN    102957803 A     3/2013

OTHER PUBLICATIONS

International Search Report for corresponding application PCT/CN2013/085712 filed on Oct. 22, 2013; dated Jun. 10, 2014.

*Primary Examiner* — Steve D Agosta
(74) *Attorney, Agent, or Firm* — Cantor Colburn LLP

(57) ABSTRACT

The disclosure discloses a method and device for unlocking a mobile terminal, which relate to the technical field of mobile terminals. The method includes the following steps that: when a mobile terminal is in a locking state, a time length for an object to stay close to a screen of the mobile terminal and to be maintained within a pre-determined distance range is determined; a corresponding unlocking signal is generated according to the time length; and the mobile terminal is unlocked according to the unlocking signal. According to the disclosure, the mobile terminal can be encrypted and unlocked by using a distance sensor, which brings both great practicability and high confidentiality.

10 Claims, 2 Drawing Sheets

(51) Int. Cl.
| | |
|---|---|
| *H04M 3/16* | (2006.01) |
| *H04M 1/725* | (2006.01) |
| *G06F 21/34* | (2013.01) |
| *G06F 3/0488* | (2013.01) |
| *H04M 1/67* | (2006.01) |

(52) U.S. Cl.
CPC ..... *H04M 1/67* (2013.01); *G06F 2203/04101* (2013.01); *G06F 2203/04108* (2013.01); *H04M 2250/12* (2013.01)

(58) Field of Classification Search
USPC .......... 455/414.1, 550.1, 565, 566, 410–411; 370/310.2, 328; 715/702
See application file for complete search history.

(56) References Cited

U.S. PATENT DOCUMENTS

| | | | |
|---|---|---|---|
| 2009/0082066 A1* | 3/2009 | Katz ..................... | G06F 1/3203 455/566 |
| 2009/0164896 A1* | 6/2009 | Thorn ................... | G06F 1/1626 715/700 |
| 2009/0197615 A1* | 8/2009 | Kim ...................... | H04M 1/605 455/456.1 |
| 2011/0151934 A1* | 6/2011 | Geng .................... | H04M 1/67 455/565 |
| 2012/0046079 A1 | 2/2012 | Kim | |

\* cited by examiner

101. When a mobile terminal enters into a locking state, a time length for an object to stay close to a screen of the mobile terminal and to be maintained within a pre-determined distance range is determined 102. A corresponding unlocking signal is generated according to the time length 103. The mobile terminal is unlocked according to the unlocking signal

METHOD AND DEVICE FOR UNLOCKING MOBILE TERMINAL

TECHNICAL FIELD

The disclosure relates to the technical field of mobile terminals, and in particular to a method and device for unlocking a mobile terminal.

BACKGROUND

Currently, large-screen touch mobile phones are increasingly common. In order to avoid misoperations when users do not use the mobile phones, these mobile phones usually adopt various screen locking/unlocking technologies, and the users cannot operate touch screens in case of locking.

There are many methods for locking the mobile phones, such as a common key unlocking method, a slide unlocking method and a pattern unlocking method. In most of these unlocking solutions, the users need to operate physical keys or touch screens, thereby causing accelerated wear of the physical keys or the touch screens.

A distance sensor is a common sensor in a current mobile terminal, which is arranged on a front surface of a mobile phone and is able to detect a distance between an object and the mobile terminal so as to judge whether there is an object, within a short distance, staying close to the mobile terminal. A common usage scenario refers to that: when a user makes a call or answers a call, the mobile phone stays close to a face, and the distance sensor will inform the mobile terminal to automatically close a screen, thereby avoiding misoperations caused by a contact between the skin of the face and a touch screen.

SUMMARY

The embodiments of the disclosure provide a method and device for unlocking a mobile terminal, which can better solve the technical problem about unlocking a mobile terminal by using a distance sensor.

According to one embodiment of the disclosure, a method for unlocking a mobile terminal is provided, which may include the following steps that:

when a mobile terminal is in a locking state, determining a time length for an object to stay close to a screen of the mobile terminal and to be maintained within a pre-determined distance range; generating a corresponding unlocking signal according to the time length; and unlocking the mobile terminal according to the unlocking signal.

In an example embodiment, before determining the time length for the object to stay close to the screen of the mobile terminal and to be maintained within the pre-determined distance range, the method further comprises: starting, by the mobile terminal, a distance sensor, which is used for detecting a distance between the object and the screen of the mobile terminal.

In an example embodiment, determining the time length for the object to stay close to the screen of the mobile terminal and to be maintained within the pre-determined distance range comprises: detecting, by the mobile terminal, the distance between the object and the screen of the mobile terminal in real time by using the distance sensor, and determining whether the distance is maintained within the pre-determined distance range; and measuring a time during which the distance is maintained within the pre-determined distance range to obtain the time length.

In an example embodiment, generating the corresponding unlocking signal according to the time length comprises: comparing the time length with a pre-set time length; and when the time length is greater than the pre-set time length, generating an unlocking signal, which is used for indicating that the time length is greater than the pre-set time length, and when the time length is smaller than or equal to the pre-set time length, generating an unlocking signal, which is used for indicating that the time length is smaller than or equal to the pre-set time length.

In an example embodiment, unlocking the mobile terminal according to the unlocking signal comprises: combining the unlocking signal with one or more previously-generated unlocking signals to form an unlocking signal sequence; comparing the unlocking signal sequence with a pre-set signal sequence; and when the unlocking signal sequence is matched with the pre-set signal sequence, unlocking the mobile terminal, and when the unlocking signal sequence is not matched with the pre-set signal sequence, maintaining in the locking state.

According to another embodiment of the disclosure, a device for unlocking a mobile terminal is provided, which may include:

a time determination element, configured to determine, when a mobile terminal is in a locking state, a time length for an object to stay close to a screen of the mobile terminal and to be maintained within a pre-determined distance range; a signal generation element, configured to generate a corresponding unlocking signal according to the time length; and an unlocking element, configured to unlock the mobile terminal according to the unlocking signal.

In an example embodiment, the time determination element comprises: a distance sensor, configured to start, before determining the time length for the object to stay close to the screen of the mobile terminal and to be maintained within the pre-determined distance range, and is used for detecting a distance between the object and the screen of the mobile terminal in real time.

In an example embodiment, the time determination element further comprises: a timing sub-element, configured to measure a time during which the distance is maintained between the object and the screen of the mobile terminal within the pre-determined distance range to obtain the time length.

In an example embodiment, the signal generation element comprises: a signal comparison sub-element, configured to compare the time length with a pre-set time length; and a signal generation sub-element, configured to generate, when the time length is greater than the pre-set time length, an unlocking signal, which is used for indicating that the time length is greater than the pre-set time length, and generate, when the time length is smaller than or equal to the pre-set time length, an unlocking signal, which is used for indicating that the time length is smaller than or equal to the pre-set time length.

In an example embodiment, the unlocking element comprises: a signal combination sub-element, configured to combine the unlocking signal with one or more previously-generated unlocking signals to form an unlocking signal sequence; a sequence comparison sub-element, configured to compare the unlocking signal sequence with a pre-set signal sequence; and an unlocking sub-element, configured to unlock, when the unlocking signal sequence is matched with the pre-set signal sequence, the mobile terminal, and maintain, when the unlocking signal sequence is not matched with the pre-set signal sequence, in the locking state.

Compared with the related art, the disclosure has beneficial effects as follows.

By means of the embodiments of the disclosure, the mobile terminal can be encrypted and unlocked by using the distance sensor, which brings both great practicability and high confidentiality. Moreover, the wear rate of one or more physical keys or a touch screen of the mobile terminal is decreased.

DETAILED DESCRIPTION OF THE EMBODIMENTS

The example embodiments of the disclosure are described below with reference to the drawings. It should be understood that the example embodiments described below are only used for describing and explaining the disclosure, but not limit the disclosure.

Figure 1:
FIG. 1 is a principal block diagram of a method for unlocking a mobile terminal according to an embodiment of the disclosure.
Figure 1:

FIG. 1 is a principal block diagram of a method for unlocking a mobile terminal according to an embodiment of the disclosure. As shown in FIG. 1, the method includes the steps as follows.

Step 101: when a mobile terminal enters into a locking state, a time length for an object to stay close to a screen of the mobile terminal and to be maintained within a pre-determined distance range is determined.

Before the time length for the object to stay close to the screen of the mobile terminal and to be maintained within the pre-determined distance range is determined, the method further includes that: the mobile terminal starts a distance sensor, which is used for detecting a distance between the object and the screen of the mobile terminal.

Step 101 includes that: the mobile terminal detects the distance between the object and the screen of the mobile terminal in real time by using the distance sensor, and determines whether the distance is maintained within the pre-determined distance range; and a time during which the distance is maintained within the pre-determined distance range is measured to obtain the time length.

Step 102: a corresponding unlocking signal is generated according to the time length.

Step 102 includes that: the time length is compared with a pre-set time length; and when the time length is greater than the pre-set time length, an unlocking signal, which is used for indicating that the time length is greater than the pre-set time length, is generated, and otherwise, an unlocking signal, which is used for indicating that the time length is smaller than or equal to the pre-set time length, is generated.

Step 103: the mobile terminal is unlocked according to the unlocking signal.

Step 103 includes that: the unlocking signal is combined with one or more previously-generated unlocking signals to form an unlocking signal sequence; the unlocking signal sequence is compared with a pre-set signal sequence; and when the unlocking signal sequence is matched with the pre-set signal sequence, the mobile terminal is unlocked, and when the unlocking signal sequence is not matched with the pre-set signal sequence, the locking state is maintained.

Figure 2:
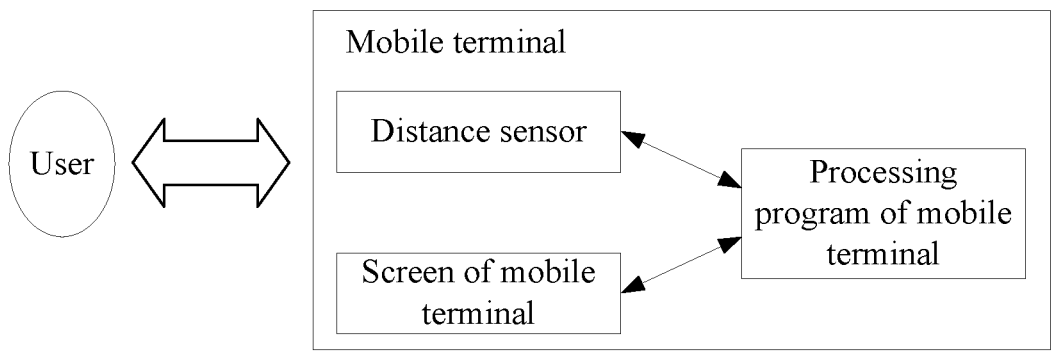
FIG. 2 is a schematic diagram of an unlocking device according to an embodiment of the disclosure.

FIG. 2 is a schematic diagram of an unlocking device according to an embodiment of the disclosure. As shown in FIG. 2, the distance sensor of the mobile terminal, a processing program of the mobile terminal and the screen of the mobile terminal are mainly involved. The distance sensor may detect that the object stays close to the screen of the mobile terminal within a short distance; when a user covers the distance sensor by hands or other objects, the distance sensor reports information to the processing program of the mobile terminal; when the user moves the hands or the other objects away, the distance sensor will inform the processing program of the mobile terminal in a similar way; and when the hands of the user cover the distance sensor all the time without being moved away, the distance sensor will continuously report the information, so as to time a covered time length for the distance sensor. In the disclosure, a signal similar to a Morse code is simulated by the time length for the user to cover the distance sensor. For example, a motion of quickly moving the hands away after the user covers the distance sensor is representative of a short signal of 'ticking', a motion of moving the hands away after the user covers the distance sensor for a longer time is representative of a long signal of 'rattling', and a pre-set signal password can be input by repeatedly covering the distance sensor via the user of a mobile phone according to the covered time length, so that an unlocking function is realized. That is to say, if the covered time length for the distance sensor is greater than the pre-set time length, the time length is recorded as a long signal which can be represented by a symbol '—', and if the covered time length for the distance sensor is smaller than or equal to the pre-set time length, the time length is recorded as a short signal which can be represented by a symbol '-'. The user can pre-set the unlocking signal sequence, such as '- - — -', which is representative of 'F' in the Morse code, in the mobile phone.

In order to realize the unlocking function, the disclosure provides a specific unlocking device of a mobile terminal, and the unlocking device includes a time determination element, a signal generation element and an unlocking element, wherein a time determination element is configured to determine, when a mobile terminal enters into a locking state, a time length for an object to stay close to a screen of the mobile terminal and to be maintained within a pre-determined distance range. The time determination element includes a distance sensor and a time measurement sub-element, wherein the distance sensor is started before the time length is determined, and is used for detecting a distance between the object and the screen of the mobile terminal in real time; and the time measurement sub-element is configured to time for measure a time during which the distance is maintained between the object and the screen of the mobile terminal within the pre-determined distance range to obtain the time length.

The signal generation element is configured to generate a corresponding unlocking signal according to the time length. The signal generation element includes a signal comparison sub-element and a signal generation sub-element, wherein the signal comparison sub-element is configured to compare the time length with a pre-set time length; and the signal generation sub-element is configured to generate, when the time length is greater than the pre-set time length, an unlocking signal, which is used for indicating that the time length is greater than the pre-set time length, and generate, otherwise, an unlocking signal, which is used for indicating that the time length is smaller than or equal to the pre-set time length.

The unlocking element is configured to unlock the mobile terminal according to the unlocking signal. The unlocking element includes a signal combination sub-element, a sequence comparison sub-element and an unlocking sub-element, wherein the signal combination sub-element is configured to combine the unlocking signal with one or more previously-generated unlocking signals to form an unlocking signal sequence; the sequence comparison sub-element is configured to compare the unlocking signal sequence with a pre-set signal sequence; and the unlocking sub-element is configured to unlock, when the unlocking signal sequence is matched with the pre-set signal sequence, the mobile terminal, and maintain, otherwise, in the locking state.

Figure 3:
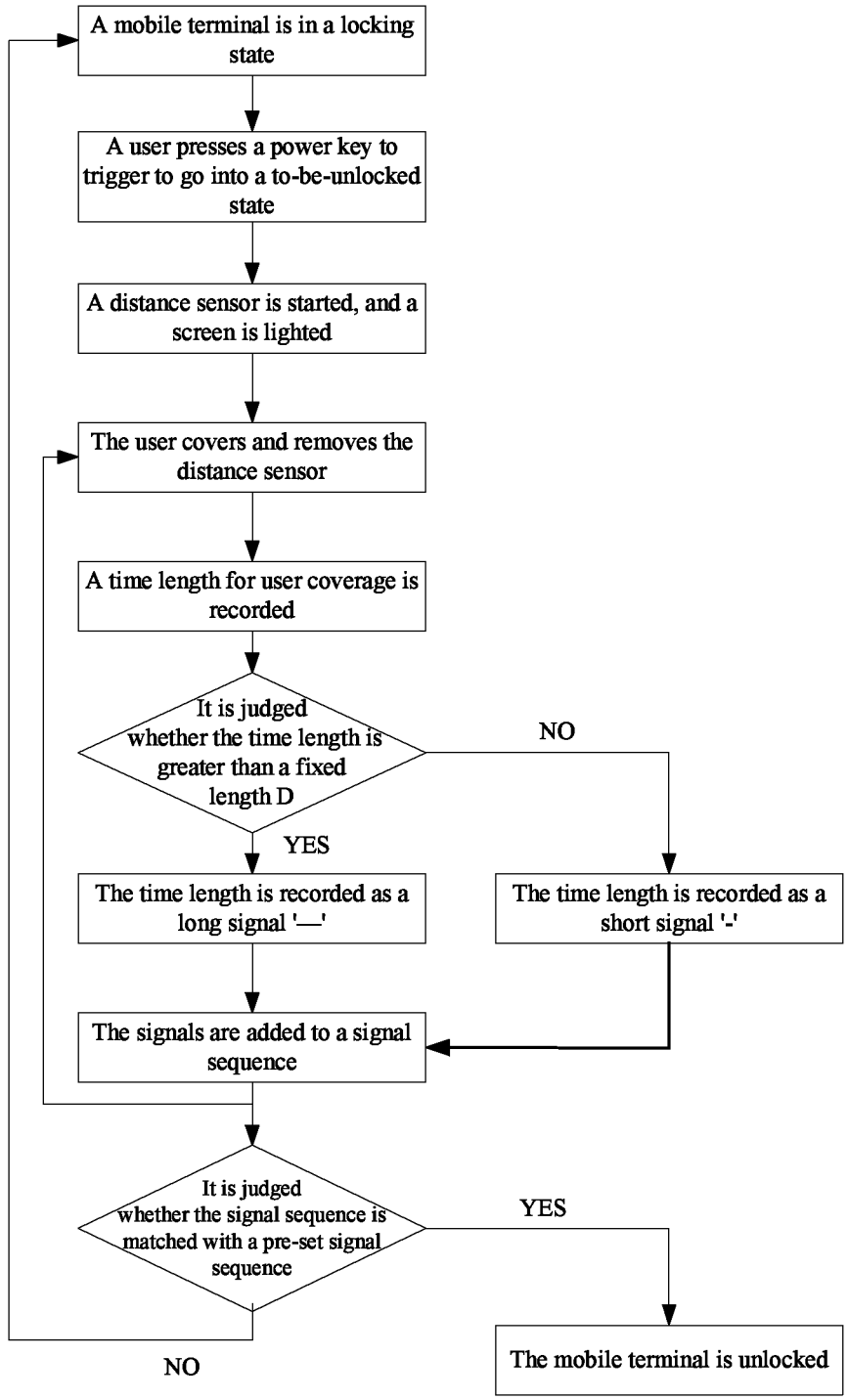
FIG. 3 is a flowchart of an unlocking processing program according to an embodiment of the disclosure.

The method for unlocking a mobile terminal using the distance sensor, proposed by the disclosure, is not limited to screen unlocking of the mobile terminal, and can be used for encrypted protection of certain software components according to the same principle, such as software components, relating to user privacy information, namely a telephone book, a short message and the like. As shown in FIG. 3, the disclosure is further described by taking the screen unlocking of the mobile terminal as an example.

FIG. 3 is a flowchart of an unlocking processing program according to an embodiment of the disclosure. As shown in FIG. 3, the method includes the steps as follows.

Step 1: a mobile terminal is in a locking state.

Step 2: a user presses a power key or adopts other ways to trigger a processing program of the mobile terminal to light a display screen.

Step 3: the mobile terminal starts a distance sensor to enter into a working state, and detects that an object stays close to the mobile terminal.

Step 4: when the user covers the distance sensor by hands or other objects, the distance sensor informs the processing program of the mobile terminal, and the processing program of the mobile terminal starts to time; and when the user moves the hands or the other objects away, the distance sensor informs the processing program of the mobile terminal, and the processing program of the mobile terminal stops timing.

Step 5: a persistent time length for the user to cover the distance sensor is recorded.

Step 6: the time length is compared with a pre-set time length (namely a fixed time length D), if the time length is greater than the fixed time length D, Step 7 is executed, and otherwise, Step 8 is executed.

Step 7: if the time length is greater than the fixed time length D, the processing program of the mobile terminal identifies that the user inputs a long signal '—', namely an unlocking signal, which is used for indicating that the time length is greater than the fixed time length D, is generated.

Step 8: if the time length is smaller than or equal to the fixed time length D, the processing program of the mobile terminal identifies that the user inputs a short signal '-', namely an unlocking signal, which is used for indicating that the time length is smaller than or equal to the fixed time length D, is generated.

Step 9: the unlocking signal is combined with one or more previously-generated unlocking signals to form an unlocking signal sequence, that is to say, the generated unlocking signal is added to the unlocking signal sequence to form a new unlocking signal sequence composed of the long signal '—' and the short signal '-'.

Furthermore, by means of repeated coverage and moving-away motions applied to the distance sensor by the user, the processing program of the mobile terminal will indentify the type of a signal generated each time by the operation of the user so as to form an unlocking signal sequence having the long and short signals.

Step 10: the unlocking signal sequence is compared with a pre-set signal sequence, if the unlocking signal sequence is matched with the pre-set signal sequence, Step 11 is executed, and otherwise, Step 1 is executed.

Step 11: the screen of the mobile terminal is unlocked, and otherwise, the locking state is maintained.

In order to be convenient for the user to confirm an own input each time, whenever the mobile terminal identifies an unlocking signal generated by the operation of the user, a signal type is displayed according to an image on the display screen of the mobile terminal. For example, when the user inputs the long signal, a mobile terminal software displays a strip-shaped graph on the screen, and when the user inputs the short signal, the mobile terminal software displays a dotted graph on the screen.

In order to handle a situation of misoperations of the user, a graph button can be placed on the touch screen, and the user can remove a previous input by clicking the graph button.

When the unlocking signal sequence input by the user is not in accordance with the pre-set signal sequence, the mobile terminal reminds the user of misoperations; in order to prevent an illegal user from decoding the signal sequence, under the condition that the user inputs the unlocking signal sequence wrongly, continuously and repeatedly, the mobile terminal stops an unlocking function, and the user is allowed to perform an unlocking operation after waiting for a certain time.

Furthermore, if the distance sensor does not detect a signal input within a set time length after being started, namely the distance between the object and the screen of the mobile terminal is not detected, the mobile terminal closes the unlocking function, quits an unlocking state, and waits for the user to re-trigger the unlocking state.

Furthermore, if the covered time length for the distance sensor exceeds pre-determined time without release, the mobile terminal determines screen unlocking timeout, quits the unlocking state, and waits for the user to re-trigger unlocking.

The embodiment is an example embodiment. After the mobile terminal lights the screen, the user can check whether the input is correct via the screen, thereby improving the accuracy of the input.

As another embodiment, the distance sensor of the mobile terminal is always in the working state, when the mobile terminal is in the locking state and the screen is not lighted (namely the screen is black), Step 3 to Step 11 can be repeatedly executed for screen unlocking, namely Step 2 as shown in FIG. 3 is omitted.

To sum up, the disclosure has the following technical effects:

1. according to the disclosure, the mobile terminal can be encrypted and unlocked, and the practicality and the confidentiality are high; and 2. according to the disclosure, the wear of the one or more physical keys or the touch screen of the mobile terminal can be reduced.

The above is a detailed description to the disclosure, but the disclosure is not limited thereto. Those skilled in the art can make various modifications according to the principle of the disclosure. Thus, it should be understood that these modifications made according to the principle of the disclosure shall fall within the protection scope of the disclosure.

INDUSTRIAL APPLICABILITY

The technical solutions provided by the disclosure can be applied to an unlocking process of the mobile terminal. By means of the technical solution of determining the time length for the object to stay close to the screen of the mobile terminal and to be maintained within the pre-determined distance range when the mobile terminal is in the locking state, generating the corresponding unlocking signal according to the time length and unlocking the mobile terminal according to the unlocking signal, the problem in the related art that the one or more physical keys or the touch screen of the mobile terminal is seriously worn is solved, and the unlocking confidentiality and practicality of the mobile terminal are improved.

What is claimed is:

1. A method for unlocking a mobile terminal, comprising:
   when a mobile terminal is in a locking state, determining a time length for an object to stay close to a screen of the mobile terminal and to be maintained within a pre-determined distance range;
   generating a corresponding unlocking signal according to the time length; and
   unlocking the mobile terminal according to the unlocking signal;
   wherein generating the corresponding unlocking signal according to the time length comprises:
   comparing the time length with a pre-set time length; and
   when the time length is greater than the pre-set time length, generating an unlocking signal, which is used for indicating that the time length is greater than the pre-set time length, and when the time length is smaller than or equal to the pre-set time length, generating an unlocking signal, which is used for indicating that the time length is smaller than or equal to the pre-set time length;
   wherein unlocking the mobile terminal according to the unlocking signal comprises:
   combining the unlocking signal with one or more previously-generated unlocking signals to form an unlocking signal sequence;
   comparing the unlocking signal sequence with a pre-set signal sequence; and
   when the unlocking signal sequence is matched with the pre-set signal sequence, unlocking the mobile terminal, and when the unlocking signal sequence is not matched with the pre-set signal sequence, maintaining in the locking state.

2. The method as claimed in claim 1, wherein before determining the time length for the object to stay close to the screen of the mobile terminal and to be maintained within the pre-determined distance range, the method further comprises: starting, by the mobile terminal, a distance sensor, which is used for detecting a distance between the object and the screen of the mobile terminal.

3. The method as claimed in claim 2, wherein determining the time length for the object to stay close to the screen of the mobile terminal and to be maintained within the pre-determined distance range comprises:
   detecting, by the mobile terminal, the distance between the object and the screen of the mobile terminal in real time by using the distance sensor, and determining whether the distance is maintained within the pre-determined distance range; and
   measuring a time during which the distance is maintained within the pre-determined distance range to obtain the time length.

4. The method as claimed in claim 1, wherein the unlocking signal sequence is generated by repeatedly covering a distance sensor of the terminal with different time lengths.

5. The method as claimed in claim 1, the method further comprises:
   displaying a signal type corresponding to each generated unlocking signal on the screen of the mobile terminal.

6. A mobile terminal unlocking device, comprising:
   a time determination element, configured to determine, when a mobile terminal is in a locking state, a time length for an object to stay close to a screen of the mobile terminal and to be maintained within a pre-determined distance range;
   a signal generation element, configured to generate a corresponding unlocking signal according to the time length; and
   an unlocking element, configured to unlock the mobile terminal according to the unlocking signal;
   wherein the signal generation element comprises:
   a signal comparison sub-element, configured to compare the time length with a pre-set time length; and
   a signal generation sub-element, configured to generate, when the time length is greater than the pre-set time length, an unlocking signal, which is used for indicating that the time length is greater than the pre-set time length, and generate, when the time length is smaller than or equal to the pre-set time length, an unlocking signal, which is used for indicating that the time length is smaller than or equal to the pre-set time length;
   wherein the unlocking element comprises:
   a signal combination sub-element, configured to combine the unlocking signal with one or more previously-generated unlocking signals to form an unlocking signal sequence;
   a sequence comparison sub-element, configured to compare the unlocking signal sequence with a pre-set signal sequence; and
   an unlocking sub-element, configured to unlock, when the unlocking signal sequence is matched with the pre-set signal sequence, the mobile terminal, and maintain, when the unlocking signal sequence is not matched with the pre-set signal sequence, in the locking state.

7. The device as claimed in claim 6, wherein the time determination element comprises:
   a distance sensor, configured to start, before determining the time length for the object to stay close to the screen of the mobile terminal and to be maintained within the pre-determined distance range, and is used for detecting a distance between the object and the screen of the mobile terminal in real time.

8. The device as claimed in claim 7, wherein the time determination element further comprises:
   a timing sub-element, configured to measure a time during which the distance is maintained between the object and the screen of the mobile terminal within the pre-determined distance range to obtain the time length.

9. The device as claimed in claim 6, wherein the unlocking signal sequence is generated by repeatedly covering a distance sensor of the terminal with different time lengths.

10. The device as claimed in claim 6, the device is further configured to display a signal type corresponding to each generated unlocking signal on the screen of the mobile terminal.

* * * * *